United States Patent
Budagavi et al.

(10) Patent No.: US 10,152,782 B2
(45) Date of Patent: Dec. 11, 2018

(54) METHOD AND APPARATUS FOR CREATING, STREAMING, AND RENDERING HDR IMAGES

(71) Applicant: Samsung Electronics Co., Ltd, Suwon-si (KR)

(72) Inventors: Madhukar Budagavi, Plano, TX (US); Hossein Najaf-Zadeh, Allen, TX (US); Esmaeil Faramarzi, Richardson, TX (US); Ankur Saxena, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 15/255,125

(22) Filed: Sep. 1, 2016

(65) Prior Publication Data

US 2017/0236260 A1     Aug. 17, 2017

Related U.S. Application Data

(60) Provisional application No. 62/294,782, filed on Feb. 12, 2016.

(51) Int. Cl.
     *G06T 5/50*      (2006.01)
     *H04N 19/184*      (2014.01)

(52) U.S. Cl.
     CPC .............. *G06T 5/50* (2013.01); *H04N 19/184* (2014.11); *G06T 2207/10004* (2013.01)

(58) Field of Classification Search
None
See application file for complete search history.

(56) References Cited

U.S. PATENT DOCUMENTS

| | | |
|---|---|---|
| 5,818,964 A | 10/1998 | Itoh |
| 2004/0001091 A1 | 1/2004 | Kressin |
| 2005/0285974 A1 | 12/2005 | Kim |
| 2007/0273610 A1 | 11/2007 | Baillot |
| 2012/0127284 A1 | 5/2012 | Bar-Zeev et al. |
| 2014/0079335 A1 | 3/2014 | Sun |
| 2015/0156469 A1 | 6/2015 | Qu et al. |
| 2016/0343315 A1* | 11/2016 | Richards ................ G09G 3/20 |

FOREIGN PATENT DOCUMENTS

| | | |
|---|---|---|
| CN | 101938605 | 1/2011 |
| WO | 2015/123774 A1 | 8/2015 |

OTHER PUBLICATIONS

International Search Report dated May 23, 2017 in connection with International Patent Application No. PCT/KR2017/001324.
Written Opinion of the International Searching Authority dated May 23, 2017 in connection with International Patent Application No. PCT/KR2017/001324.

* cited by examiner

*Primary Examiner* — Mark Roz

(57) ABSTRACT

A user equipment includes a modem receives a compressed bitstream and metadata. The UE also includes a decoder that decodes the compressed bitstream to generate an HDR image, an inertial measurement unit that determines viewpoint information based on an orientation of the UE, and a graphics processing unit (GPU). The GPU maps the HDR image onto a surface and renders a portion of the HDR image based on the metadata and the viewpoint information. A display displays the portion of the HDR image.

16 Claims, 12 Drawing Sheets

Top-bottom Frame-packing HDR

Left-right Frame-packing HDR

METHOD AND APPARATUS FOR CREATING, STREAMING, AND RENDERING HDR IMAGES

CROSS-REFERENCE TO RELATED APPLICATION(S) AND CLAIM OF PRIORITY

This application claims priority under 35 U.S.C. § 119(e) to U.S. Provisional Patent Application No. 62/294,782 filed on Feb. 12, 2016. The above-identified provisional patent application is hereby incorporated by reference in its entirety.

TECHNICAL FIELD

This disclosure relates generally to image enhancement. More specifically, this disclosure relates to a method and apparatus for creating, streaming, and rendering High Dynamic Range (HDR) images.

BACKGROUND

Currently, new High Dynamic Range (HDR) cameras and displays are becoming prominent. HDR cameras can capture images having intensities that may range from 0.01 to around 10,000 nits. While studios are primarily creating HDR content, due to the high cost of the HDR cameras, they have not yet reached normal consumers.

360° video usually includes a high dynamic range covering very dark regions to very bright objects. However, because HDR cameras are expensive, users may only have standard dynamic range (SDR) cameras. As such, when images from the SDR cameras are stitched together to create a 360° image or video, some details in the image or video may be lost.

SUMMARY

This disclosure provides a method and apparatus for creating, streaming, and rendering High Dynamic Range (HDR) images.

In a first embodiment, a user equipment (UE) includes a modem that receives a compressed bitstream and metadata. The UE also includes a decoder that decodes the compressed bitstream to generate an HDR image, an inertial measurement unit that determines viewpoint information based on an orientation of the UE, and a graphics processing unit (GPU). The GPU maps the HDR image onto a surface and renders a portion of the HDR image based on the metadata and the viewpoint information. A display displays the portion of the HDR image.

In a second embodiment, a user equipment (UE) for creating a high dynamic range (HDR) image includes a receiver and a processor. The receiver receives a plurality of standard dynamic range (SDR) images. The processor combines the plurality of SDR images to generate the HDR image.

In a third embodiment, a method for rendering a high dynamic range (HDR) image in user equipment (UE) includes receiving an image, determining a viewpoint based on an orientation of the UE, receiving metadata, and rendering a portion of the image based on the viewpoint and the metadata to generate the HDR image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
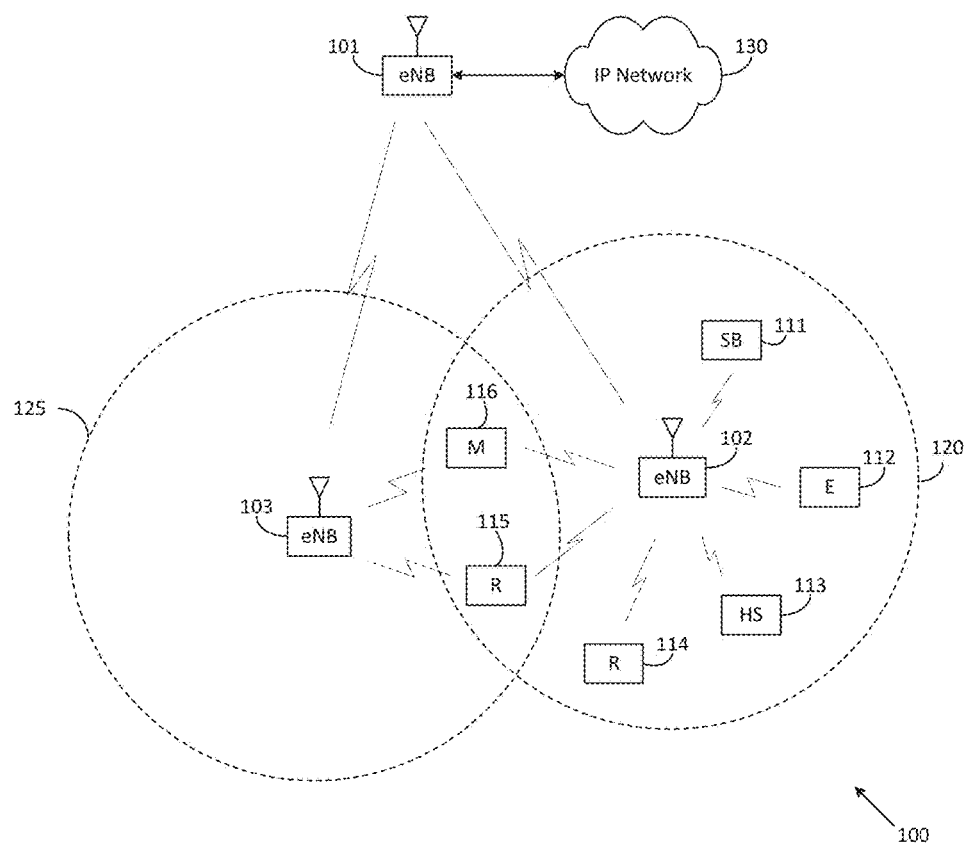
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," "television" or "user device." For the sake of convenience, the terms "user equipment" and "UE" are used in this patent document to refer to a television, display, monitor, or other such wired or wireless devices. The UE can be in communication with another UE, such as a mobile device, or other television.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

One or more embodiments of this disclosure provide methods and apparatuses to create HDR content from SDR images. In one example, multiple SDR images are fused or blended in order to create an HDR image. As used herein, one or more embodiments of this disclosure refers to an SDR or HDR image. However, different embodiments of this disclosure can also be used with video. When referencing an image herein, whether SDR or HDR, the different embodiments of this disclosure could be referring to a frame within a video for a given frame rate (number of pictures per unit of time).

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
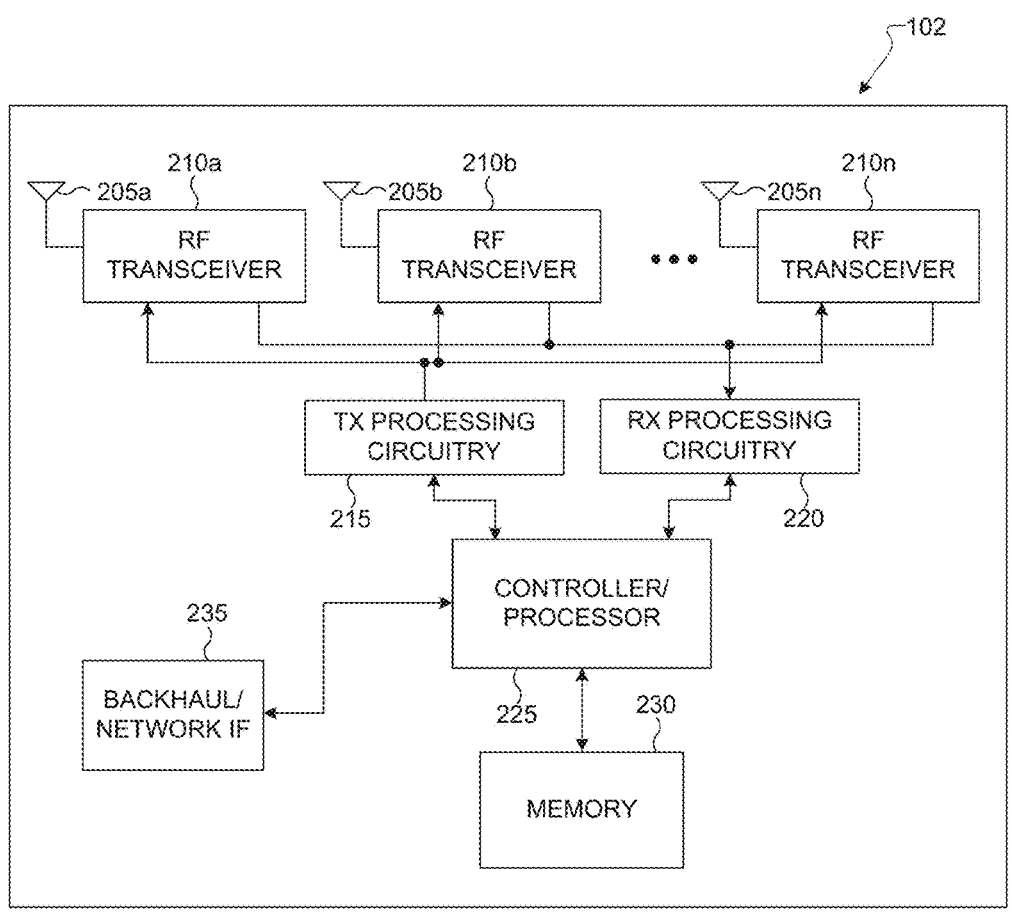
FIG. 2 illustrates an example eNodeB (eNB) according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver or receiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
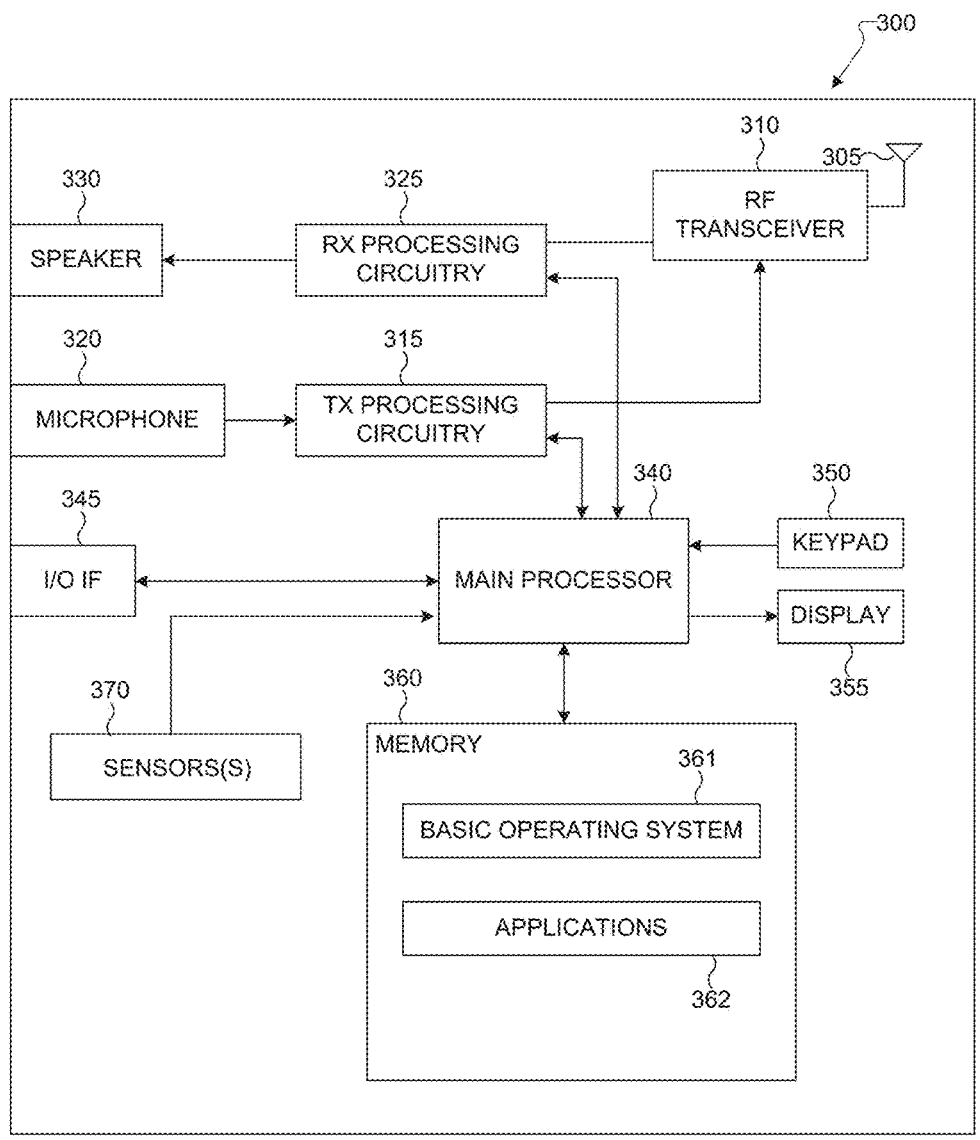
FIG. 3 illustrates an example user equipment (UE) according to this disclosure.

FIG. 3 illustrates example user equipment (UE) 300 according to this disclosure. The embodiment of the UE 300 illustrated in FIG. 3 is for illustration only, and any of the UEs 111-116 of FIG. 1 could have the same or similar configuration. However, UEs come in a wide variety of configurations, and FIG. 3 does not limit the scope of this disclosure to any particular implementation of a UE. In one or more embodiments of this disclosure, the UE 300 may be a camera capable of capturing SDR images and converting the SDR images to HDR images. In other embodiments, UE 300 may be a head mounted display (HMD) or a television.

As shown in FIG. 3, the UE 300 includes an antenna 305, a radio frequency (RF) transceiver 310, transmit (TX) processing circuitry 315, a microphone 320, and receive (RX) processing circuitry 325. The UE 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 or receiver receives, from the antenna 305, an incoming RF signal transmitted by an eNB of the network 100. The RF transceiver 310 or receiver down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 300 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 300 can use the keypad 350 to enter data into the UE 300. The display 355 may be a liquid crystal display or other display capable of rendering text and/or at least limited graphics, such as from web sites. In one embodiment, the keypad 350 could also be a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the main processor 340. Part of the memory 360 could include a random access memory (RAM), and another part of the memory 360 could include a Flash memory or other read-only memory (ROM).

UE 300 further includes one or more sensors 370 that can meter a physical quantity or detect an activation state of the UE 300 and convert metered or detected information into an electrical signal. For example, sensor 370 may include one or more buttons for touch input, e.g., on the headset or the UE 300, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 370 can further include a control circuit for controlling at least one of the sensors included therein. As will be discussed in greater detail below, one or more of these sensor(s) 370 may be used to control a UI, detect UI inputs, determine the orientation and facing direction of the user for 3D content display identification, etc. Any of these sensor(s) 370 may be located within the UE 300, within a headset configured to hold the UE 300, or in both the headset and UE 300, for example, in embodiments where the UE 300 includes a headset.

Although FIG. 3 illustrates one example of UE 300, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone for use with or integrated in an HMD, UEs could be configured to operate as other types of mobile or stationary devices. In another example embodiment, when UE 116 is a television, the UE 116 may not include a transceiver, keypad, or microphone. The UE 116 may include a receiver or decoder without a transmitter or encoder.

Figure 4A:
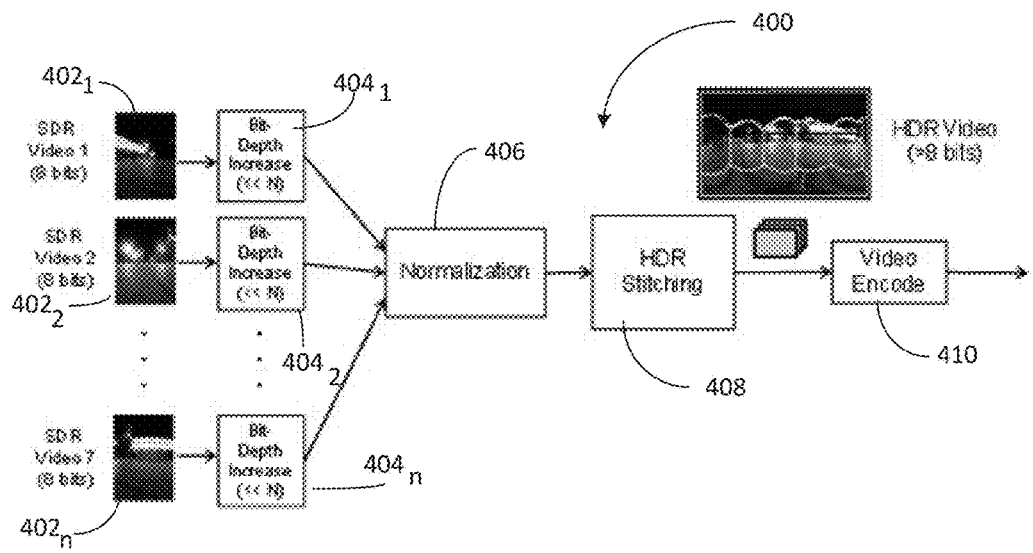
FIGS. 4A and 4B illustrate example methods for creating HDR content according to embodiments of this disclosure.

FIG. 4A illustrates an example method 400 for creating HDR content according to an embodiment of this disclosure. The processes shown in method 400 may be implemented by, e.g., processor 340 of UE 300 of FIG. 3. As shown in FIG. 4A, in method 400, a bit depth of a plurality of 8-bit SDR images $402_1$ to $402_n$ are increased to 10-bits in processes $404_1$ to $404_n$. After increasing the bit depth of each of the SDR images, each of the images is normalized in process 406. Normalization is performed by using the peak pixel value across all the SDR images $402_1$ to $402_n$. In process 408, the SDR images $402_1$ to $402_n$ that have gone through a bit depth increase and have been normalized are stitched together using known techniques. In process 410, the stitched image is encoded using any known encoding method for HDR images.

Figure 4B:
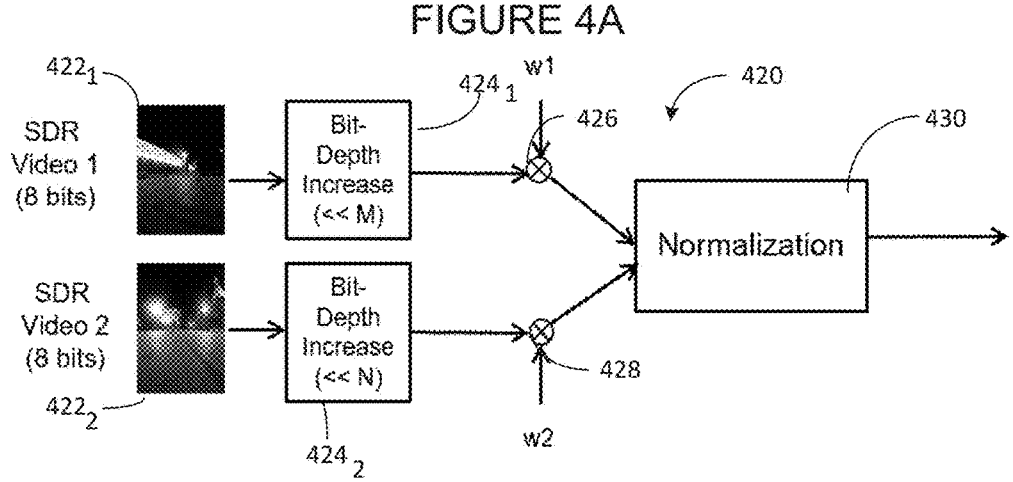

FIG. 4B illustrates another example method 420 that is similar to the method 400 shown in FIG. 4A. The processes shown in method 420 may be implemented by, e.g., processor 340 of FIG. 3. As shown in FIG. 4B, the bit depth of each SDR image $422_1$ and $422_2$ is increased by a different number of bits in processes $424_1$ and $424_2$. Specifically, the bit depth increase applied to each image may vary depending on the dynamic range covered by the SDR image. If the dynamic range of, e.g., the SDR image $422_1$, is high, a first bit depth increase to a value M in process $424_1$ is applied to SDR image $422_1$. If the dynamic range of, e.g., the SDR image $422_2$, is low, a second bit depth increase to a value N in process $424_2$ is applied to SDR image $422_2$. A weight 426 is then applied to the bit depth increased image $422_1$ while a weight 428 is applied to the bit depth increased image $422_2$ before being normalized in process 430.

Figure 5:
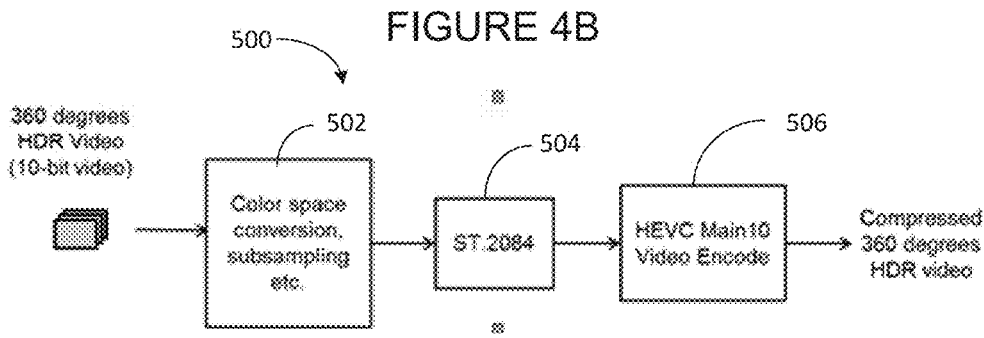
FIG. 5 illustrates an example method for encoding HDR content according to an embodiment of this disclosure.

FIG. 5 illustrates an example method 500 for encoding HDR content according to an embodiment of this disclosure. The processes shown in method 500 may be implemented by, e.g., processor 340 of a UE 300 of FIG. 3. As shown in FIG. 5, 360° HDR video, e.g., video stitched together in process 408 of FIG. 4A, undergoes color space conversion and subsampling in process 502. In process 504, a transfer function e.g., ST 2084, is applied to the converted and subsampled video. In process 506, the video is encoded using high efficiency video encoding method such as HEVC Main 10 video encoder to generate a compressed 360° HDR video.

Figure 6:
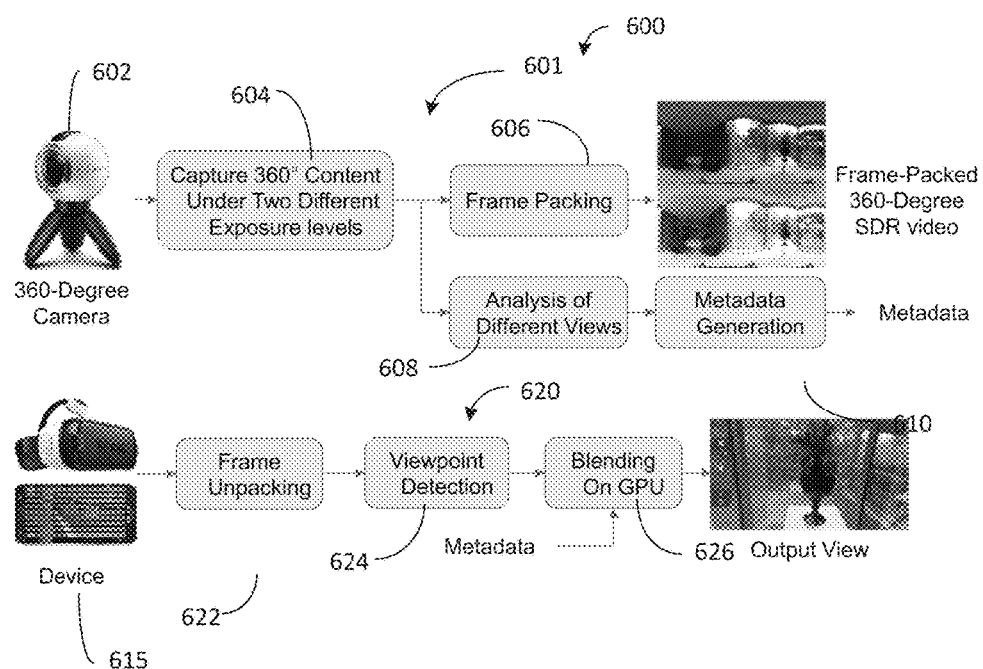
FIG. 6 illustrates an example method for encoding and decoding HDR content according to an embodiment of this disclosure.
Figure 7A:
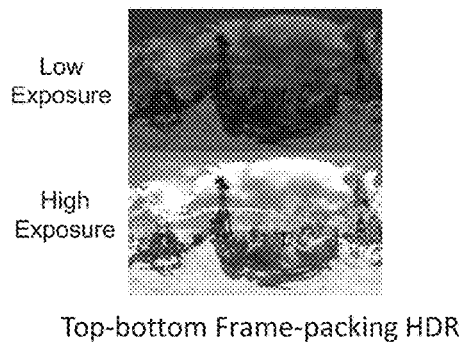
FIGS. 7A and 7B illustrate frame packing methods according to an embodiment of this disclosure
Figure 7B:
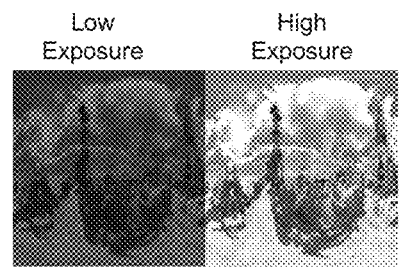

FIG. 6 illustrates a method 600 for creating and rendering HDR content according to an embodiment of this disclosure. As shown in method 600, HDR content is created in method 601 in which a 360° camera 602 may capture 360° content under two different exposure levels, a low exposure and a high exposure, in process 604. HDR content may be a 360° image or a 360° video. For ease of explanation, the process will be described with reference to a 360° SDR image. In process 606, two SDR images, a low exposure image and high exposure image, are frame packed. The frame packing may be performed in a top-bottom method as shown in FIG. 7A or in a left-right method as shown in FIG. 7B. In process 608, the different images are analyzed in order to generate metadata in process 610. The metadata includes blend factors to use for fusing or blending the high and low exposure images depending on the view directions (pitch, yaw). The blend factor is roughly inversely proportional to the brightness in the viewport pointed to by the current viewpoint. The higher the blend factor, the higher the weight given to a low exposure image. The blend factor may be calculated according to Equations 1 and 2 for all pitch and yaw values as follows:

$$viewportMaxRGB = \text{max of } R, G, B \text{ values of all pixels in the viewport } (i, j) \quad \text{(Eq. 1)}$$

-continued $$blendFactor(i, j) = \frac{(maxRGBGlobal - viewportMaxRGB)}{(maxRGBGlobal - minRGBGlobal)} \quad \text{(Eq. 2)}$$

where minRGBGlobal is the min of R, G, B values of all pixels in the 360° image, maxRGBGlobal is the max of R, G, B values of all pixels in the 360° image, i is the pitch value, and j is the yaw value.

The frame packed 360° SDR image is transmitted to a device such as a head mounted device (HMD) 615 where the HMD 615 renders the 360° SDR image as an HDR image as shown in method 620. In other embodiments, the frame packed 360° SDR image may be transmitted to a television. In method 620, the packed frames are unpacked in process 622 and a user's viewpoint is detected using one or more sensors, e.g., one or more sensors 370 as shown in FIG. 3, in process 624. In embodiments, where the frame packed 360° SDR image is transmitted to a television, a user may operate a remote to select a viewpoint. The one or more sensors provide viewpoint information, which includes pitch and yaw information, to a graphics processing unit (GPU) included in the HMD 615. Based on the viewpoint information and the blend factor in the metadata, the GPU renders a portion of the 360° SDR image corresponding to the viewpoint as a simulated HDR image in process 626. The rendered image is displayed on the HMD 615.

Figure 8:
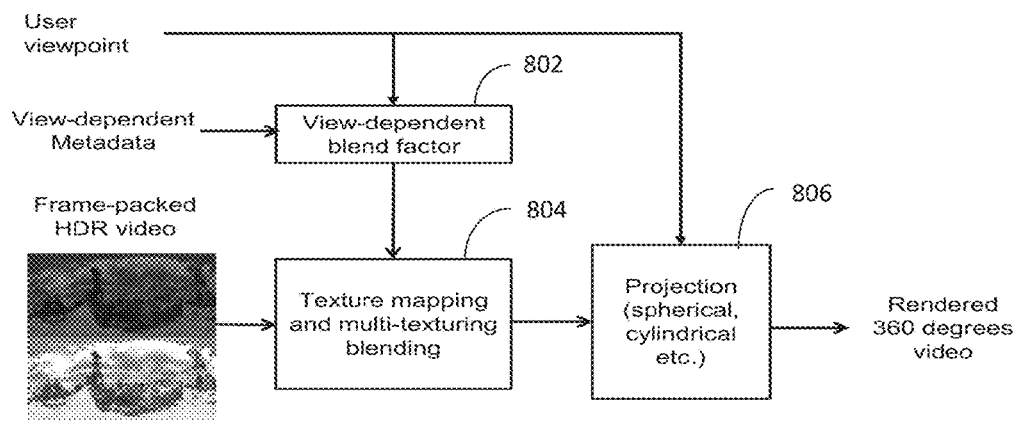
FIG. 8 illustrates an example method for rendering an HDR image according to an embodiment of the disclosure.

FIG. 8 illustrates a method for rendering HDR content according to an embodiment of this disclosure. The method of FIG. 8 may be performed by a processor, e.g., processor 340, of a UE 300, such as an HMD. As shown in FIG. 8, a user viewpoint, which may be determined by one or more sensors 370, and view-dependent metadata is provided to process 802 to determine a view-dependent blend factor. The view-dependent metadata may include one or more blend factors that correspond to specific viewpoints. The view-dependent blend factor is provided to process 804 where the frame packed video is unpacked and texture mapped. The view-dependent blend factor is applied to the unpacked and texture mapped video and then projected onto a surface, such as a spherical or cylindrical surface, in process 806 before the 360° image is displayed.

Figure 9A:
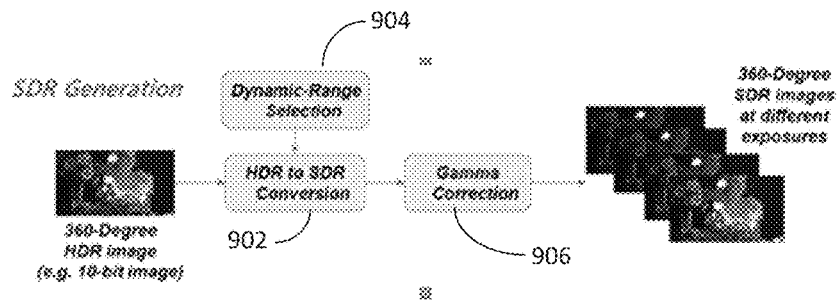
FIGS. 9A and 9B illustrate an example method for rendering an HDR image according to an embodiment of the disclosure.
Figure 9B:
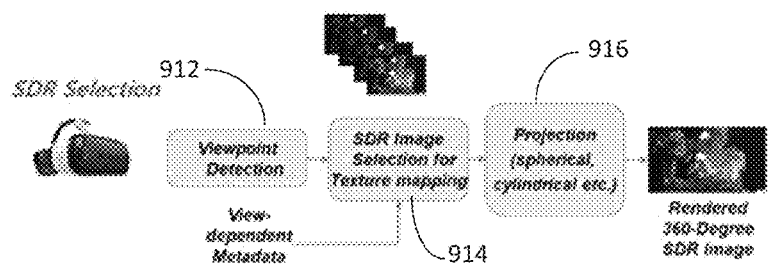

FIGS. 9A and 9B illustrate a method for rendering an HDR image on an SDR device according to an embodiment of this disclosure. The method of FIGS. 9A and 9B may be performed by a processor, e.g., processor 340, of a UE 300, such as an HMD. As shown in FIG. 9A, a 360° HDR 10-bit image is converted to a plurality of SDR images having different exposure levels in process 902 based on a dynamic range selected in process 904. The selected dynamic range may be based on the dynamic range of the device that will display the 360° HDR image. In process 906, each of the SDR images are gamma corrected and then outputted as a plurality of 360° SDR images at different exposure levels.

As shown in FIG. 9B, a viewpoint, which includes pitch and yaw information, is detected, e.g., by one or more sensors 370, in process 912 and an SDR image among the plurality of 360° SDR images is selected in process 914. The SDR image may be selected based on view-dependent metadata which may include one or more blend factors. The selected SDR image is then projected on to a surface, such as a spherical or cylindrical surface, in process 916.

Figure 10:
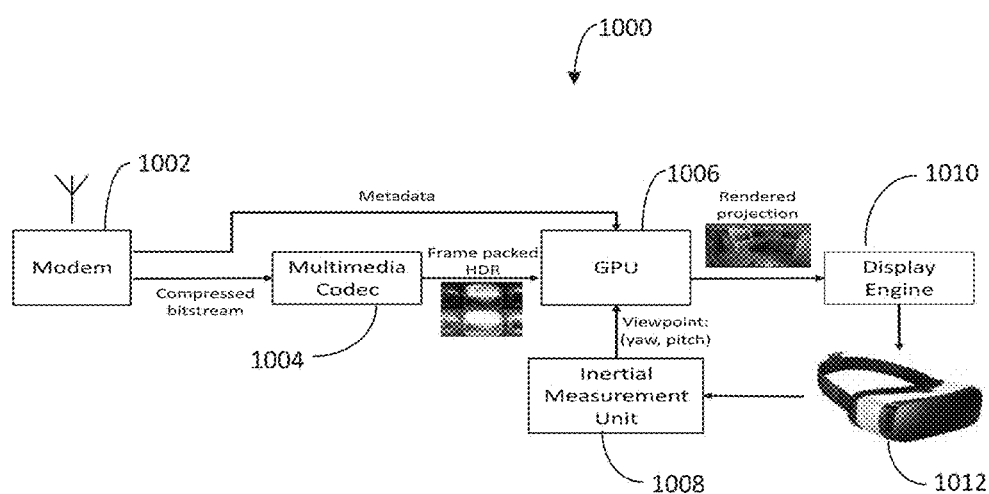
FIG. 10 illustrates a system for rendering an HDR image according to an embodiment of the disclosure

FIG. 10 illustrates a system 1000 for rendering an HDR image according to an embodiment of the disclosure. As shown in FIG. 10, the system 1000 includes a modem 1002, a multimedia codec 1004, a GPU 1006, an inertial measurement unit 1008, a display engine 1010 and a display 1012.

The modem 1002 receives a compressed bitstream and view-dependent metadata. The compressed bit stream is provided to the multimedia codec 1004 for decoding. The output of the multimedia codec 1004 is a 360° frame packed HDR video which is sent to the GPU 1006 where it is mapped onto a virtual surface, such as a spherical or cylindrical surface. User viewpoint information, which includes pitch and yaw information, is also provided to the GPU 1006 by the inertial measurement unit 1008. The inertial measurement unit 1008 may include one or more sensors such as the one or more sensors 370 of FIG. 3. The GPU 1006 also receives the view-dependent metadata from the modem 1002. The GPU 1006 uses the viewpoint information and the view-dependent metadata to combine and render a portion of the 360° HDR video that is visible to a user. The rendered video is sent to the display engine 1010 which causes the rendered video to be displayed on the display 1012.

Figure 11:
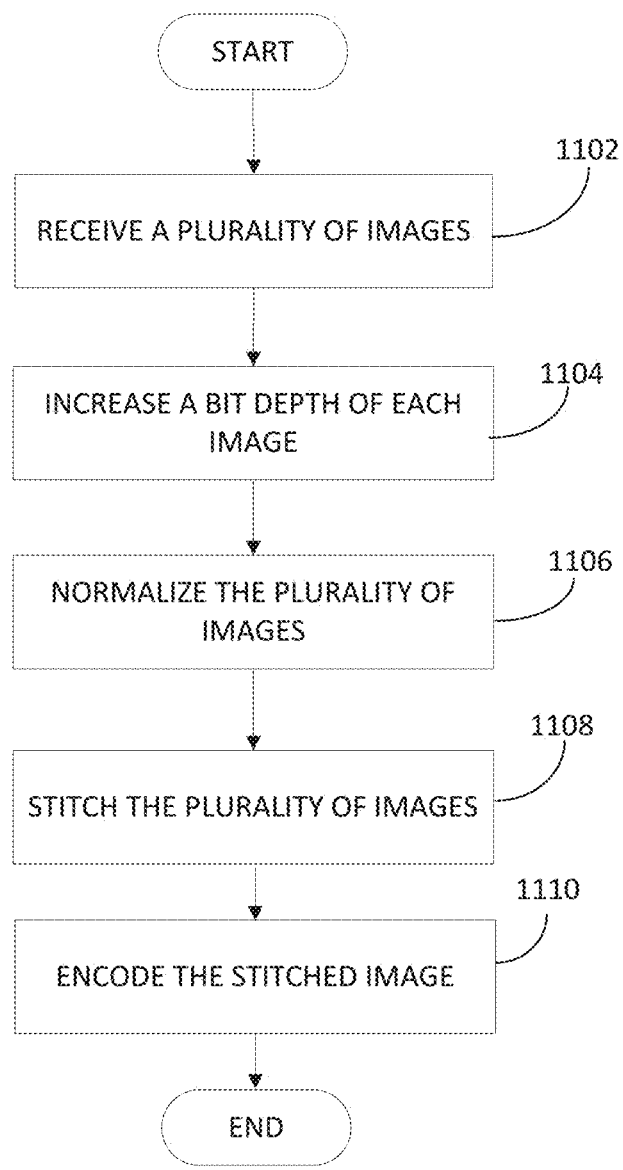
FIG. 11 illustrates a flowchart for creating an HDR image according to an embodiment of the disclosure.

FIG. 11 illustrates a flowchart for creating an HDR image according to an embodiment of the disclosure. As shown in FIG. 11, one method for creating an HDR image begins in process 1102 where a plurality of SDR images are received in a UE such as UE 300 of FIG. 3. Any number of SDR images may be received to create an HDR image. In process 1104, the bit depth of each SDR image is increased. The bit depth may be fixed or variable as described above. Further, different weights may be applied to the bit depth increased images as described above. In process 1106, each of the bit depth increased images are normalized and then stitched together is process 1108. In process 1110, the stitched image is encoded using any known encoding techniques for encoding HDR images. The processes depicted in FIG. 11 may be performed by a processor, such as processor 340.

Figure 12:
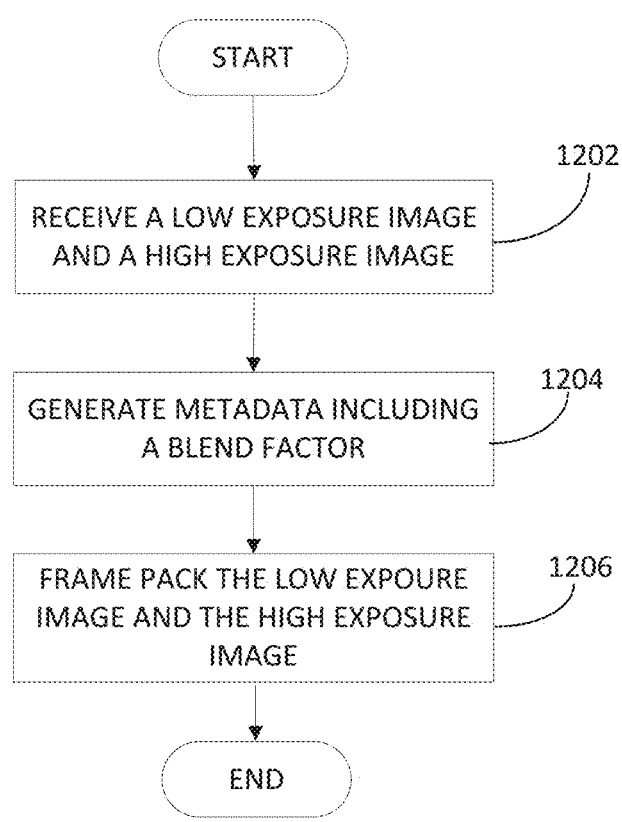
FIG. 12 illustrates a flowchart for creating an HDR image according to an embodiment of the disclosure.

FIG. 12 illustrates a flowchart for creating an HDR image according to another embodiment of the disclosure. As shown in FIG. 12, one method for creating an HDR image begins in process 1202 where a low exposure image and a high exposure image a received in a UE such as UE 300 of FIG. 3. In process 1204, the low exposure image and high exposure image are analyzed to determine a blend factor. The blend factor is provided as metadata along with a frame packed image generated in process 1206. The frame packed image is generated by frame packing the low exposure image and the high exposure image. The processes depicted in FIG. 12 may be performed by a processor, such as processor 340.

Figure 13:
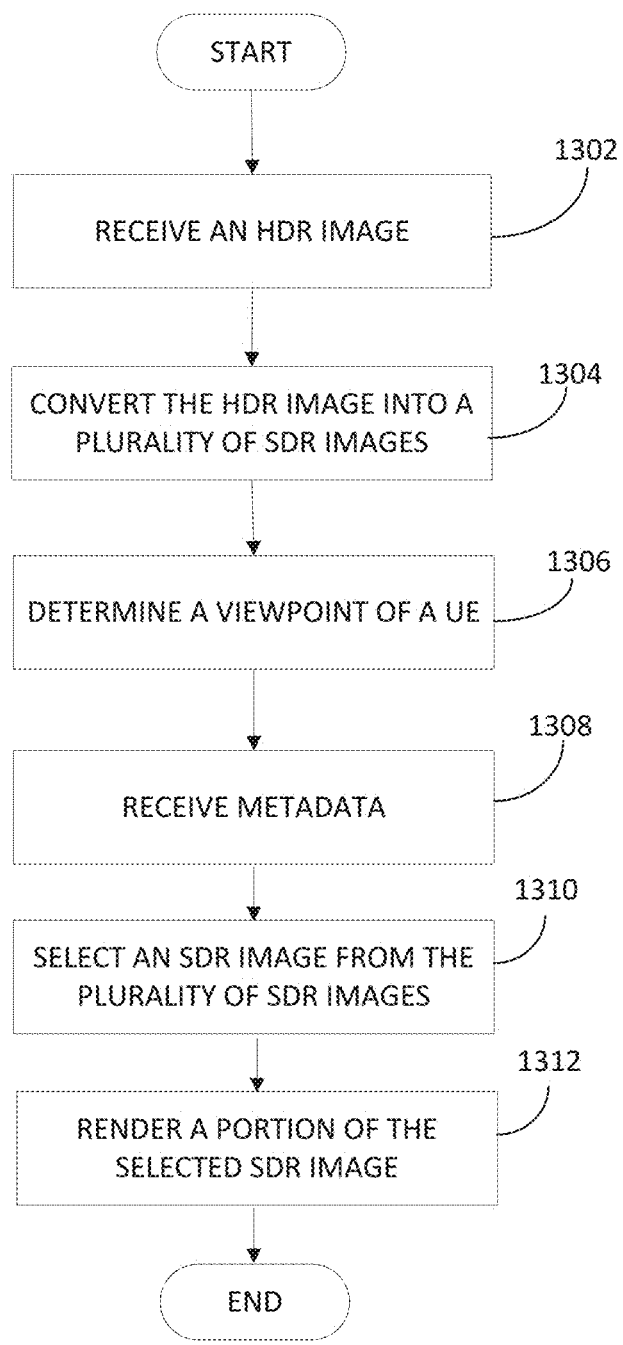
FIG. 13 illustrates a flowchart for rendering an HDR image according to an embodiment of the present disclosure.

FIG. 13 illustrates a flowchart for rendering an HDR image according to an embodiment of the present disclosure. As shown in FIG. 13, a UE, such as UE 300 of FIG. 3, may receive an HDR image in process 1302 and convert the HDR image into a plurality of SDR images having different exposure levels in process 1304 based on the dynamic range display capability of the UE 300. The UE 300 determines an orientation of the UE 300 using one or more sensors 370 to determine viewpoint information (pitch, yaw) in process 1306. In process 1308, the UE also receives viewpoint metadata. The viewpoint information and the viewpoint metadata are used by the UE 300 to select an SDR image from the plurality of SDR images in process 1310. Based on the viewpoint information, the UE 300 renders a portion of the selected SDR image to be displayed on the UE 300 in process 1312 by projecting the portion of the image onto a surface such as a spherical or cylindrical surface.

Figure 14:
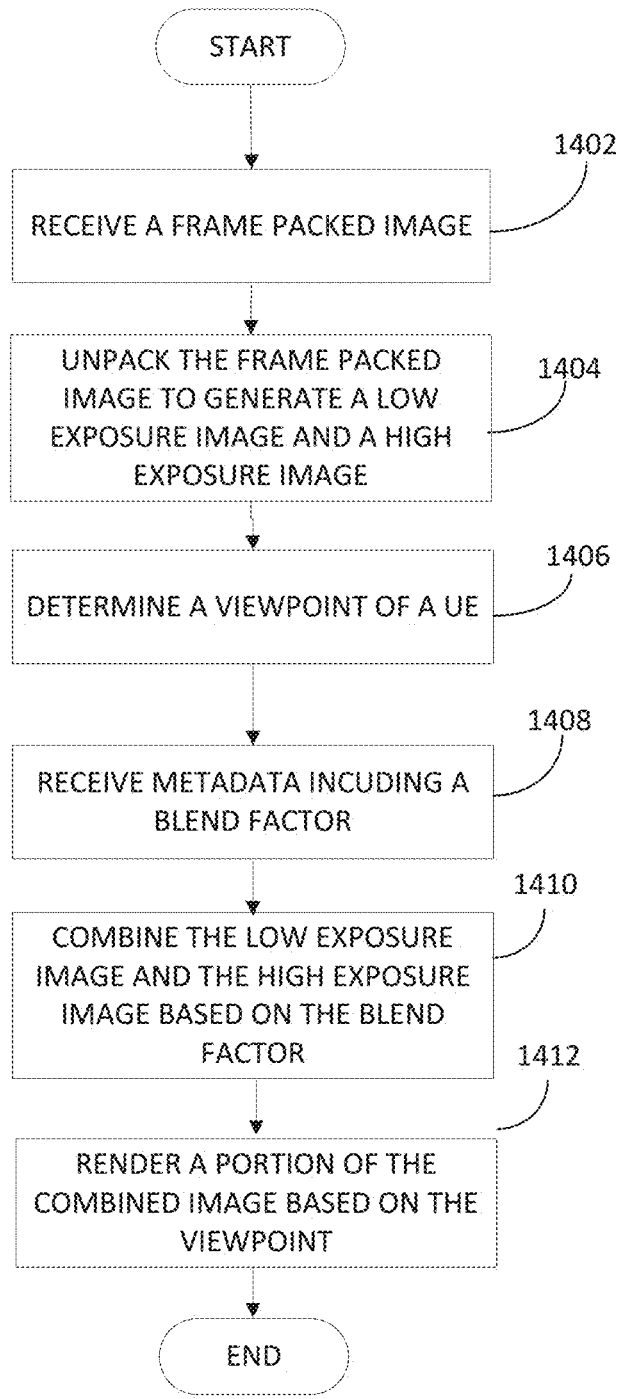
FIG. 14 illustrates a flowchart for rendering an HDR image according to an embodiment of the present disclosure.

FIG. 14 illustrates a flowchart for rendering an HDR image according to another embodiment of the present disclosure. As shown in FIG. 14, a UE, such as UE 300 of FIG. 3, may receive a frame packed image in process 1402 and unpack the frame packed image into low exposure image and a high exposure image in process 1404. The UE 300 determines an orientation of the UE 300 using one or more sensors 370 to determine viewpoint information (pitch, yaw) in process 1406. In process 1408, the UE also receives metadata including a blend factor. The blend factor is used by the UE 300 to fuse or blend the low exposure image and the high exposure image in process 1410. Based on the viewpoint information, the UE 300 renders a portion of the combined image to be displayed on the UE 300 in process 1412 by projecting the portion of the image onto a surface such as a spherical or cylindrical surface.

Figure 15:
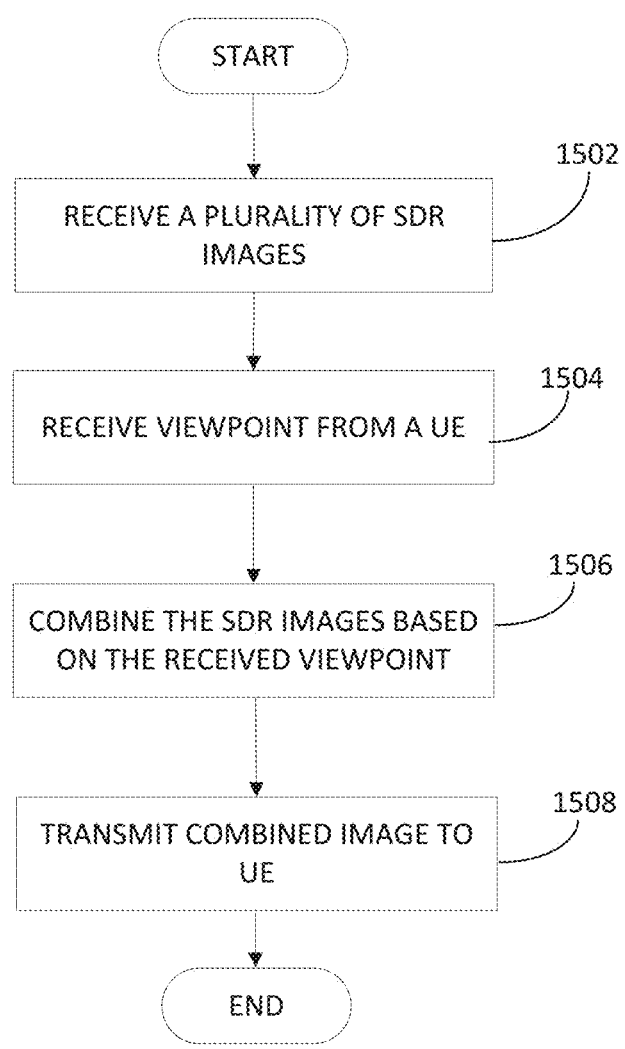
FIG. 15 illustrates a flowchart for rendering an HDR image according to an embodiment of the present disclosure.

FIG. 15 illustrates a flowchart for rendering an HDR image according to another embodiment of the present disclosure. As shown in FIG. 15, one method for rendering an HDR image begins in process 1502 where a plurality of SDR images are received in a server from a camera or a memory having SDR image stored therein. In process 1504, a viewpoint may be received from a UE such as UE 300 of FIG. 3. In process 1506, the plurality of SDR images are combined based on the received viewpoint. In process 1508, the combined image is transmitted to the UE.

Although the figures illustrate different examples of devices, various changes may be made to the embodiments. In some embodiments, the HDR effect can be created from multiple images not just two. By doing so, since more images are used to create the output image, it's very likely to improve the quality of the rendered image. When combining input images, different weight can be given to different images based on e.g., user preference or scene characteristics. As an example, if combining input images are performed based on scene characteristics, images can be linearly combined according to Equation 3 as follows:

$$I_{out} = \frac{1}{\sum_{i=1}^{K} \alpha_i} \sum_{i=1}^{K} \alpha_i I_i \quad \text{(Eq. 3)}$$

where $I_i$ is the i-th SDR image, $I_{out}$ is the output image, K is the number of SDR images, and $\alpha_i$ is the weight for SDR image i. The weight for the i-th SDR image is given by Equation 4 as follows:

$$\alpha_i = \begin{cases} \left|1 - \frac{m_i}{M}\right| \cdot \frac{L_{pv}}{L_{peak}}, & \text{if } m_i \leq M \\ \left|1 - \frac{m_i}{M}\right| \cdot \left(1 - \frac{L_{pv}}{L_{peak}}\right), & \text{if } m_i > M \end{cases} \quad \text{(Eq. 4)}$$

where $m_i$ is the average luminance in SDR image i, M is the average luminance across all SDR images, $L_{pv}$ is the local peak luminance in the viewport in the HDR scene, and $L_{peak}$ is the peak luminance in the HDR scene.

The justification for the weight used in the above equation is as follows. When the user is viewing relatively dark part of the scene, $$\frac{L_{pv}}{L_{peak}}$$

would be small and as such the rendered video should be created from high exposure input images. That's the reason a factor of $$\left(1 - \frac{L_{pv}}{L_{peak}}\right)$$

is included in the weight for the high exposure images (i.e. $m_i > M$). For the same reasoning, a factor of $$\frac{L_{pv}}{L_{peak}}$$

is included in the weight for the low exposure images (i.e. $m_i \leq M$). When the user is viewing bright part of the scene, $$\frac{L_{pv}}{L_{peak}}$$

would be large and as such the output image would mainly be created from the low exposure images. Also, images with medium exposure (i.e. with average luminance near M) have highly overlapping luminance range, and hence a smaller weight is given to medium exposure images compared to the images covering the lower and higher ends of the luminance range. As such, a factor of $$\left|2 - \frac{m_i}{M}\right| \text{ and } \left|2 - \frac{M}{m_i}\right|$$

is included in the weight for the low exposure (i.e. $m_i \leq M$) and high exposure (i.e. $m_i > M$) images respectively.

In some embodiments, the normalization process can be made adaptive based on scene characteristics. The bit depth as well as normalization can be determined based on the luminance range in the scene. For instance, for a scene with a very large luminance range, higher bit-depth is required whereas, for a smaller luminance range, smaller bit-depth would be sufficient.

In other embodiments, different bit-depths (i.e. luminance range) may be used for different images, e.g. default view can have higher bit-depth than other views to improve default view quality. The default view may be created using an HDR camera while other view(s) may be created used an SDR camera. Also, any other views with a high luminance range can be captured by an HDR camera. In this approach, internal bit-depth increase is only performed on those videos which are created with SDR cameras. Prior to stitching, the bit-depth of SDR videos are increased and then stitching is performed.

In some embodiments, a combination of low and high exposure images can be done locally based on the local peak luminance/exposure level in the low and high exposure images. For example, a high exposure image may have over exposed areas that are washed out. Linearly combining the low exposure and high exposure image in a spatially uniform manner will lead to quality degradation in the over exposed area in the combined image. The linear combination may be performed when the high exposure image is not over exposed. In other embodiments, nonlinear combination using sigmoid weighting (or other non-linear techniques) can be performed to improve resulting video quality.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) for rendering a high dynamic range (HDR) image comprising:
   a modem configured to receive a compressed bitstream and metadata, wherein the compressed bitstream includes a first standard dynamic range (SDR) image and a second SDR image and wherein the metadata includes a plurality of blend factors corresponding to view directions;
   a decoder configured to decode the compressed bitstream to generate the first SDR image and the second SDR image;
   an inertial measurement unit configured to determine viewpoint information based on an orientation of the UE;
   a graphics processing unit (GPU) configured to:
      combine the first SDR image and the second SDR image to generate a view dependent HDR image based on the blend factors and the viewpoint information;
      map the HDR image onto a surface; and
      render a portion of the mapped HDR image based on the metadata and the viewpoint information; and
   a display configured to display the portion of the mapped HDR image.

2. The UE of claim 1, wherein the plurality of blend factors further correspond to weights applied to the first SDR image and the second SDR image.

3. The UE of claim 1, wherein the first SDR image is a low exposure image and the second SDR image is a high exposure image.

4. The UE of claim 1, wherein the first SDR image and the second SDR image included in the compressed bitstream are included in a frame packed image.

5. A method for rendering a high dynamic range (HDR) image in a user equipment (UE), the method comprising:
   receiving a compressed bitstream and metadata, wherein the compressed bitstream includes a first standard dynamic range (SDR) image and a second SDR image and wherein the metadata includes a plurality of blend factors corresponding to view directions;
   decoding the compressed bitstream to generate the first SDR image and the second SDR image;
   determining viewpoint information based on an orientation of the UE;
   combining the first SDR image and the second SDR image to generate a view dependent HDR image based on the blend factors and the viewpoint information;
   mapping the HDR image onto a surface;
   rendering a portion of the mapped HDR image based on the metadata and the viewpoint information; and
   displaying the portion of the mapped HDR image.

6. The method of claim 5, wherein the surface is at least one of a spherical surface or a cylindrical surface.

7. The method of claim 5, wherein the first SDR image and the second SDR image included in the compressed bitstream are included in a frame packed image.

8. The method of claim 5, wherein the first SDR image is a low exposure image and the second SDR image is a high exposure image.

9. The method of claim 5, wherein the plurality of blend factors further correspond to weights applied to the first SDR image and the second SDR image.

10. The method of claim 5, wherein the viewpoint information includes pitch and yaw information.

11. The method of claim 7, wherein the frame packed image is packed in a top-bottom method or a left-right method.

12. The method of claim 11, further comprising unpacking the first SDR image and the second SDR image from the frame packed image.

13. The UE of claim 1, wherein the surface is at least one of a spherical surface or a cylindrical surface.

14. The UE of claim 1, wherein the viewpoint information includes pitch and yaw information.

15. The UE of claim 4, wherein the frame packed image is packed in a top-bottom method or a left-right method.

16. The UE of claim 15, wherein the GPU is further configured to unpack the first SDR image and the second SDR image from the frame packed image.

* * * * *